Feb. 24, 1948.    W. R. MALTBY ET AL    2,436,394
MAGNETIC DETECTOR
Filed June 6, 1941    3 Sheets-Sheet 1

INVENTORS
W.R. MALTBY
R.H. PARK
ATTORNEY

Feb. 24, 1948. W. R. MALTBY ET AL 2,436,394
MAGNETIC DETECTOR
Filed June 6, 1941 3 Sheets-Sheet 2
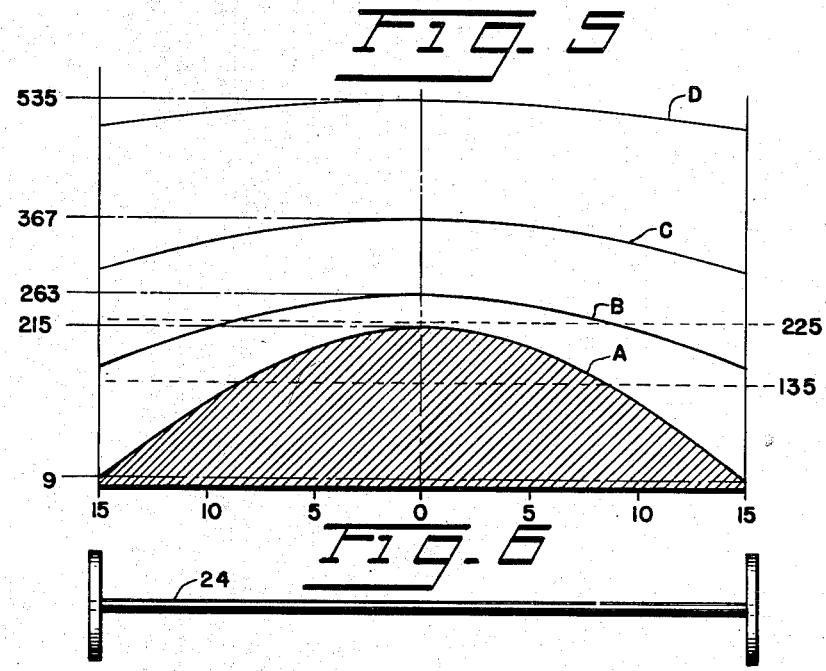
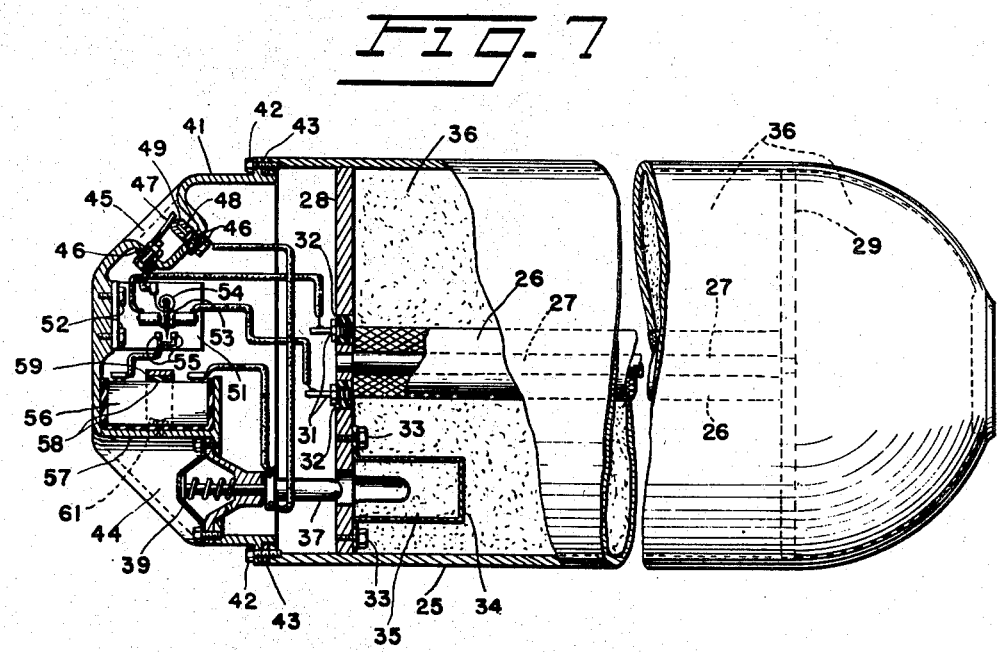
INVENTORS
W.R. MALTBY
R.H. PARK Feb. 24, 1948.  W. R. MALTBY ET AL  2,436,394
MAGNETIC DETECTOR
Filed June 6, 1941  3 Sheets-Sheet 3
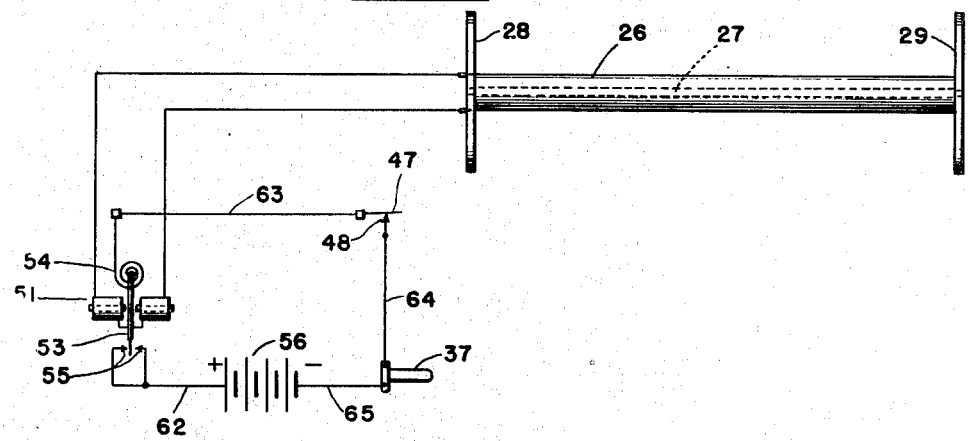
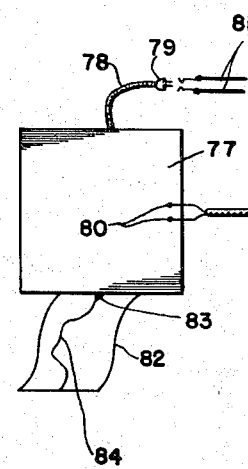
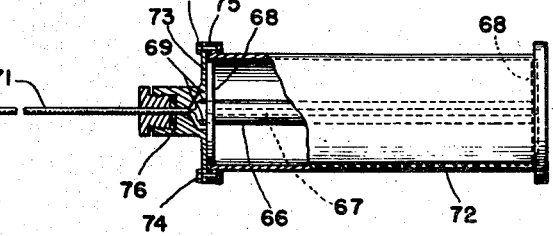
INVENTOR
W.R. MALTBY
R.H. PARK
ATTORNEY Patented Feb. 24, 1948

2,436,394

UNITED STATES PATENT OFFICE 2,436,394

MAGNETIC DETECTOR

Wilson R. Maltby, Washington, D. C., and
Robert H. Park, Pluckemin, N. J.

Application June 6, 1941, Serial No. 396,960

9 Claims. (Cl. 102—18)

(Granted under the act of March 3, 1883, as
amended April 30, 1928; 370 O. G. 757)

This invention relates to magnetic detectors and more particularly to devices of a magnetic type, for detecting vessels or other magnetic bodies, which devices are controlled by changes in the magnetic field acting thereon, these changes being due primarily to local disturbances caused by the movement of such magnetic bodies within the vicinity of the instrument.

It is well known that a coil of wire interlinking with a magnetic field, either the earth's natural magnetic field or a field provided by a simple magnet or electromagnetically, will have an electromotive force generated in it if the strength of the magnetic field interlinking the coil is varied, and furthermore if the coil encircles a bar or core of magnetic material the number of flux linkages of the coil will be increased for the reason that the core provides a better path or magnetic circuit than air for the magnetic field. Thus the passage of a vessel containing a considerable amount of magnetic material in the vicinity of such a coil disposed adjacent the path of the vessel will produce a magnetic disturbance and the magnetic field will be strengthened momentarily thereby generating a corresponding electromotive force within the coil. This electromotive force is of a transient character in that it lasts only while the body of magnetic material is passing the coil so as to change the field strength, and is referred to herein as a wave or impulse.

It has been the practice heretofore in devices of this character for detecting the presence of magnetic bodies such, for example, as are used in certain types of vehicular traffic control systems, to provide within the coil a core of iron, or a material known in the trade are permalloy, having a composition of substantially 87½ per cent nickel and 12½ per cent iron thereby to increase the number of flux linkages of the coil. Such cores or rods, when employed for this purpose, are usually of long and slender proportions in which the diameter or cross section of the core is maintained substantially constant throughout the length of the rod. When a current actuated relay is used as an indicator of flux change the greatest sensitivity is obtained when the coil resistance is made substantially equal to the relay circuit resistance. For a coil of fixed resistance which matches the resistance of the aforesaid relay, the flux linkages per turn of the coil decrease as the coil winding approaches the end of the core and for this reason a more efficient coil structure is provided by a coil encircling only a fractional part of the length of the core.

In order that a considerable electromotive force of a magnetic induction coil may be realized in detecting changes in the earth's natural magnetic field, it has heretofore been necessary to provide the coil with a ferro-magnetic rod or core of very long and slender proportions. In cases heretofore where the coil is employed for the purpose of detecting changes in a magnetic field caused by a vessel or as a firing device for a submarine mine, for example, the length of the core is necessarily restricted by the space available and the sensitivity and range of detection of the coil is correspondingly limited thereby.

In accordance with the present invention, the increased sensitivity of the detecting device is accomplished by providing a pair of circular magnetic caps of relatively large area at the ends of the magnetic rod whereby the concentration of the magnetic flux is greatly increased and rendered substantially uniform throughout the length of the rod. With this arrangement, the degree of concentration of the magnetic flux within a rod of relatively short length is as high as the concentration of flux at the mid portion of a uniform linear rod not provided with magnetic caps and of several times the length of the rod of the present invention. Furthermore, by employing magnetic caps on the ends of the rod or core in the manner disclosed herein, the coil encircling the rod may advantageously extend throughout the entire length of the rod without substantially decreasing the flux linkages per turn of the coil, and by winding the coil throughout the length of the core, in contradistinction to the prior art devices in which the coil can advantageously encircle only a fractional part of the length of the core, and by using a size of wire such that the total resistance of the coil is unchanged, both the number of turns and the number of flux lines gathered serve to increase the flux linkages of the coil. Furthermore, by employing magnetic caps of circular cross section in which the ends of the core are secured to the central portion of each of the caps, respectively, the optimum arrangement is provided for reducing partial linkages and increasing the total linkages of flux lines with turns of the coil.

One of the objects of the present invention is to provide a new and improved magnetic influence induction coil of simple and rugged construction which will be economical to manufacture and possess the desired qualities of reliability and efficiency in use and operation.

Another of the objects is the provision of new and improved means for increasing the sensitivity of an electromagnetic induction detector coil.

Another of the objects is the provision of new and improved means for increasing the sensitivity of response of a magnetic flux pick up coil to a change in a magnetic field.

Another of the objects is to provide a new and improved coil structure in which the electromagnetic impulse produced by a predetermined change in the magnetic field adjacent the coil will be increased.

Still another object is the provision of new and improved means for increasing the sphere of influence of a magnetic pick up device whereby the presence of a magnetic body may be detected by the device at greater distances than heretofore.

Various other objects, advantages, and improvements will become apparent from a consideration of the following description taken in connection with the accompanying drawings wherein like numerals of reference are employed to designate like parts throughout the several views and in which:

Fig. 5 illustrates graphically the effect of magnetic caps on the distribution of flux throughout the magnetic bar of Fig. 6;

Fig. 6 shows an improved bar or core structure;

Fig. 7 is a view somewhat enlarged and partly broken away of a submarine mine employing the device of Fig. 3;

Fig. 8 illustrates diagrammatically a circuit arrangement suitable for use with the mine of Fig. 7; and Fig. 9 illustrates diagrammatically an arrangement suitable for controlling an indicating device.

Figure 1:
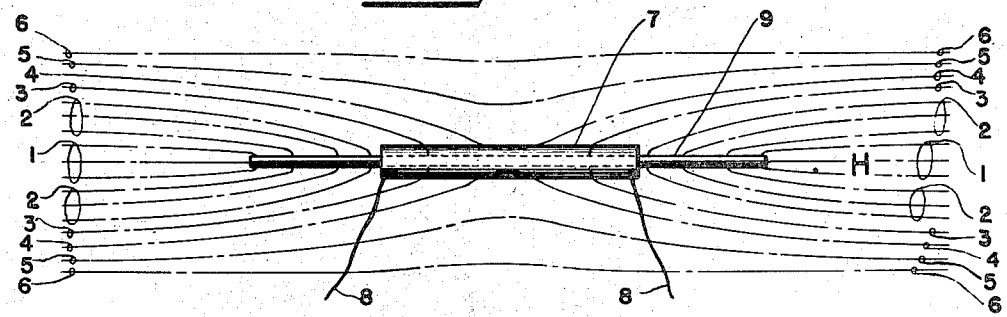
Fig. 1 shows a well known form of magnetic detecting device.

The invention will best be understood by reference first to Fig. 1 of the drawings on which is shown in diagrammatic form a portion of a magnetic field such, for example, as the earth's magnetic field indicated generally by the letter H within which is arranged a well known form of induction pick up coil 7 having ends 8 adapted to be connected to an indicating device. Disposed within the coil and extending for a distance beyond the coil at either end thereof in the direction of the field H is a rod or bar 9 of magnetic material such as iron possessing the characteristic of high permeability in a weak magnetic field or permalloy in which the reluctance is considerably less than that of air. The magnetic field H, it will be noted, has for convenience of description been shown as comprising a plurality of lines of force or magnetic flux or components thereof indicated generally by the numerals 1, 2, 3, 4, 5, and 6, of which the lines 1 engage the bar 9 at the ends thereof and pass throughout the entire length of the bar, and the lines 2 are deflected or attracted by the bar sufficiently to pass within the bar for a fractional part of the length thereof including that portion encircled by the coil 7. The lines of force 3 pass through a portion only of the coil and a fractional part of the bar encircled by the coil whereby certain turns only of the coil winding are influenced or linked by changes of the portion 3 of the magnetic field. The lines of force indicated by the numeral 4 are attracted toward the bar sufficiently to pass through a portion of the coil 7 only but not sufficiently to pass through the bar 9. From the foregoing it will be noted that the field represented by the lines 3 and 4 is linked or encircled by certain turns only of the coil 7 and this condition is referred to herein as partial linkages.

The lines of force such as those indicated by the numerals 5 and 6 are attracted somewhat by the bar but not sufficiently to engage either the bar or the coil and for this reason the lines of force 5 and 6 are ineffective to set up an electromotive force within the coil as the magnetic field H is changed. From the foregoing it will be noted that the coil 7 is adapted to be influenced in varying degrees by changes in that portion of the magnetic field H represented by the lines 1, 2, 3, and 4 and not at all by the lines 5 and 6. Whereas an increase in the length of the coil 7 sufficient to encircle the entire length of the rod 9 would increase somewhat the flux linkages of the coil, the increase in the flux linkages would not be in proportion to the increase in the ohmic resistance of the coil and the efficiency and sensitivity of such a coil would be decreased.

Figure 2:
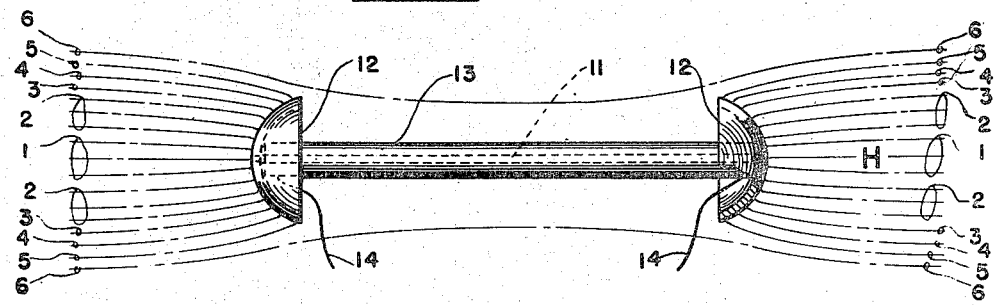
Fig. 2 is a view, partly broken away of one form of the device in accordance with the present invention.

There is shown in diagrammatic form on Fig. 2 of the drawings a core 11 according to one form of the present invention, within which a greater concentration of magnetic flux is obtained than within the core 9 by reason of the hemispherical magnetic caps 12 secured to the ends of the core 11. The caps may be attached to the core in any suitable manner, as by pressing or threading the caps on the core or clamping the caps thereto by nuts. A coil 13 preferably of a greater number of turns than the coil 9, but having the ohmic resistance thereof unchanged by reason of appropriate selection of wire size encircles the core throughout substantially the entire length of the core and is provided with ends 14 adapted to be connected to an indicator or mine firing device, as the case may be. The external field H comprising the lines of force or flux 1, 2, 3, 4, 5, and 6 of Fig. 1 has been reproduced on Fig. 2 except that the lines of force 1, 2, 3, 4 and 5 are caused to pass through the permalloy rod 11 by reason of the hemispherical caps attached thereto which concentrate and focus the magnetic field H sufficiently to embrace within all of the turns of the coil 13 substantially all of the flux represented by the lines 1, 2, 3, 4 and 5. The number of flux linkages of the coil is thereby increased without increasing the length of the rod or the ohmic resistance of the coil and thus an arrangement is provided wherein partial linkages are eliminated, the sensitivity of the coil to changes in the magnetic field adjacent the coil is increased and the sphere or range of magnetic detection is enlarged, without increasing the length of the flux gathering means or changing the ohmic resistance of the coil.

Figure 3:
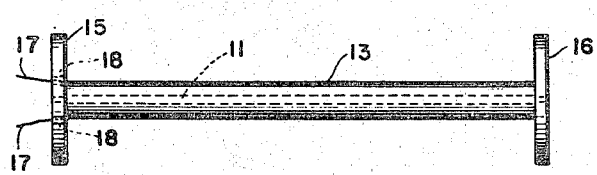
Fig. 3 shows a modified form of the device of Fig. 2.

Whereas on Fig. 2 of the drawings there is shown a magnetic core having hemispherical flux gathering caps arranged concentrically thereon, it will be understood that the flux gathering means may assume different circular proportions and shapes such, for example, as the magnetic disks or caps 15 and 16 shown on Fig. 3. In this arrangement the coil ends 17 are brought out through the magnetic cap 15 through suitable apertures therein and electrically insulated from the cap 15 as by the bushings 18 of any material suitable for the purpose such, for example, as rubber, fibre or the like. As in the device of Fig. 2 the caps are of sufficient size such that substantially all of the flux lines 1 to 5 of the field H pass within the caps 15 and 16 and the core 11 throughout the entire length of the core wherein a device is provided in which the magnetic coupling between the coil 13 and the external field is increased thereby causing an increase in the electromotive wave or impulse generated by the coil in response to a predetermined change in the magnetic field.

Figure 4:
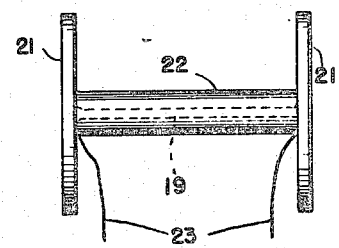
Fig. 4 shows another form of the device.

An alternative form of the device is shown on Fig. 4 of the drawings in which the length of the core is relatively short with respect to the size of the flux gathering caps 21. The increase in the area of the caps 21 compensates for the decrease in the length of the core 19 whereby the electromotive force generated by the coil 22 at the terminals 23 thereof is substantially the same as the coil 13 for a predetermined change in the magnetic field H.

It may be stated that a uniform magnetic rod when placed parallel to a magnetic field in which the lines of force are substantially straight such as the earth's natural field offers a reluctance thereto less than that of air and for this reason some of the lines of force comprising the field are deflected sufficiently to enter the rod at the ends and along the length thereof to cause the flux concentration within the rod to increase from the ends thereof toward the middle of the rod, Fig. 1. This variation in the flux concentration along the rod is illustrated on Fig. 5 in which is shown by the curve A the variation in the flux of a uniform rod or core such, for example, as illustrated in Figs. 1 and 6, of permeable material substantially thirty inches in length and one half inch in diameter when placed in and parallel to the earth's magnetic field when magnetic caps are not employed. The magnetic density at the ends of the rod is somewhat greater than the density or intensity of the earth's undisturbed field at the latitude within which the rod is disposed, the density of the magnetic field within the rod increasing until the middle of the rod is reached, at which point the flux density is a maximum.

Referring now to Fig. 5 and particularly to curve A thereof, the flux within the rod of Fig. 6 without magnetic caps thereon increases from a small value at the ends of the rod to a relatively large value at the center of the rod. The product of flux density within the rod and the cross sectional area of the rod at any point therein is a measure of the total flux in the rod at that point. The term herein referred to as effective area is obtained by dividing the total flux through the cross section of a magnetic rod at any point along the rod when disposed within a magnetic field of uniform density in the absence of the rod by the component of the flux density of the magnetic field measured at the same point in the direction of the axis of the rod with the rod removed from the field. Thus the maximum effective area for the rod 24 of Fig. 6, when magnetic caps are not employed, is 215 square inches at the midpoint which, stated differently, indicates that the same number of lines of force are concentrated at the midpoint of the rod as would be found in an area of air of 215 square inches normal to the axis of the rod if the rod were not present, whereas at the ends of the rod the effective area is only 9 square inches.

The shaded portion of Fig. 5 illustrates the total flux within the rod 24 without caps thereon and the dashed line 135 indicates the corresponding average effective area throughout the rod.

Curve B illustrates the effective area for the rod 24 of Fig. 6 when provided with magnetic caps at the ends thereof substantially one half inch in thickness and 2.1 inches in diameter, the effective area at the midpoint of the rod now being 263 and the average effective area of the rod 225. In a similar manner the curves C and D illustrate the effective areas of the rod 24 when provided with one half inch caps of 5 inches and 10 inches in diameter respectively. The maximum effective area of curve C is 367 and the maximum effective area for curve D is 535. Furthermore it will be noted that an increase in the size of the caps also causes the effective area at the ends of the rod to approach more nearly the maximum effective area at the midsection of the rod and when the diameter of the caps is equal to or greater than the length of the rod the effective area at the ends of the rod is substantially equal to the maximum effective area at the midsection of the rod.

It will be noted that the curve B also shows substantially the same effective area as a 30-inch section taken from the midsection of a rod of considerably greater length than the rod of Fig. 6, in which magnetic caps are not employed. In a similar manner the curves C and D show substantially the effective areas of a 30 inch section taken from the midsection of rods of progressively greater length without magnetic caps at the ends thereof.

On Fig. 7 is shown the magnetic detecting device of the present invention applied to an induction type mine having a circular casing 25 within which is inserted an induction coil 26 comprising the magnetic core 27 and circular flux gathering caps 28 and 29 secured thereto and of sufficient size to engage the casing about the periphery thereof and form a chamber within which the main explosive charge is disposed. An arrangement is thus provided in which the conventional partitions secured to the mine casing for enclosing the explosive charge are not required and a relatively inexpensive mine casing, therefore, may be employed. Furthermore, by providing an arrangement in which the circular flux gathering caps are of sufficient size to engage the casing about the inner periphery thereof, the optimum degree of concentration of flux within the magnetic core 27 is obtained and a high degree of sensitivity of the detecting device, including the coil 26, is effected. The ends of the coil are provided preferably with terminals 31 passing through apertures in the cap 28 and electrically insulated therefrom as by the bushings 32 of material suitable for the purpose such, for example, as rubber, fibre or the like. Secured to the cap 28 as by the bolts 33 is a receptacle 34 containing an explosive booster charge 35 adapted to detonate the main explosive charge 36 in response to the operation of the detonator 37 which passes through a suitable aperture within the cap 28 and comes to rest in operative relation to the booster charge within the casing 34 as the extender hydrostat 39 is operated by the pressure of the water within which the mine is laid.

The mine is provided with a head 41 detachably secured to the casing 25 as by the bolts 42, a gasket 43 preferably being inserted between the head and the casing to exclude water from the interior of the mine. The head includes a recessed portion 44 within which the extender hydrostat 39 is disposed and a recessed portion 45 having bushings 46 of suitable insulating material for supporting the safety switch comprising the resilient contact spring 47 and contact pin 48 in sealed relation to the head 41. The contact spring 47 is held disengaged from the contact pin 48 by a plug or stop 49 consisting of a material soluble in water, such for example as a compound of sugar, glue, glycerine or similar materials. This stop effectually prevents the spring 47 from moving into electrical contact with the contact pin 48 until the mine shall have been submerged for a sufficient length of time to allow the soluble plug to become dissolved or softened sufficiently by the action of the water to allow movement of the contact spring into the circuit closing position. An arrangement is thus provided whereby there is no possibility of prematurely exploding the mine in handling or in transporting or in launching the same, the firing mechanism being disarmed and rendered entirely incapable of acting to explode the mine until a period of time has elapsed after the mine shall have been submerged to a predetermined depth, thereby actuating the extender hydrostat to cause the detonator 37 to be brought into operative position within the booster charge 35 and the mine to be subsequently armed by the operation of the safety switch.

The head also supports a sensitive polarized relay 51 secured thereto in any suitable manner such, for example, as by the bolts 52, the relay having an armature 53 normally held by the spring 54 intermediate the contacts 55 and in electrical disengagement therefrom. A battery 56 is supported by a portion 57 of the head 41 preferably formed to receive the battery and provided with a pad 58 of suitable resilient material such, for example, as rubber, disposed about the battery to protect the battery from receiving a violent shock as the mine is launched. The battery is held in position preferably by a battery clamp member 59 secured to the portion 57 of the head as by the bolts 61.

The operation of the mine will now be described. Assume by way of example that the mine has been launched and is resting on the bed of a body of water of sufficient depth to cause the extender hydrostat 39 to operate and insert the detonator within the receptacle 34 and that a sufficient length of time has elapsed after the mine has been launched to allow the soluble plug 49 to dissolve sufficiently to operate the safety switch and thereby arm the mine.

The approach of a vessel containing a considerable quantity of magnetic material within the vicinity of the mine causes a change in the magnetic field adjacent the mine and, by reason of the magnetic caps 28 and 29 attached to the magnetic core 27, this change causes a variation in the flux linkages of the coil 26 thereby generating a wave or impulse of electromotive force at the terminals 31 thereof of sufficient magnitude to cause the armature 53 of relay 51 to operate and close a firing circuit, Fig. 8, from the positive terminal of battery 56 by way of conductor 62, contact 55 and armature 53 of relay 51, spring 54, conductor 63, contact spring 47 and contact pin 48 of the safety switch, conductor 64, detonator 37, conductor 65 and thence to the negative terminal of battery 56. The detonator is fired over the circuit just described thereby causing the mine to explode.

It is well known that in a steel vessel the mass of the magnetic material varies along the length of the vessel, there being less magnetic material in the bow that amidships, for example, the magnetic material also varying in accordance with the disposition of the engines, boilers and, in the case of warships, according to the size and position of the armament of the vessel. The influence of such a vessel upon the magnetic field at a particular fixed point varies as the different parts of the vessel are moved past the fixed point. The vessel may also acquire permanent magnetism in the process of fabrication or during movement of the vessel through the magnetic field of the earth and the magnetism thus acquired may additionally influence the magnetic field adjacent the vessel. From the foregoing it will be apparent that each vessel will influence a fixed magnetic detector according to a particular magnetic pattern individual to the vessel and referred to herein as a ship's signature.

An arrangement suitable for detecting and recording a ship's signature is shown on Fig. 9 in which is illustrated a magnetic detector comprising a coil 66 encircling a magnetic core 67 provided with flux gathering caps 68 and having terminals 69 adapted to be connected to the conductors of an electrical cable 71. The detector is enclosed preferably within a casing 72 provided with a cap 73 secured thereto as by the bolts 74, a watertight joint between the casing and the cap being insured by the gasket 75 inserted beneath the cap. The casing and cap are preferably of any non-magnetic material suitable for the purpose such, for example, as brass, the cap being provided with a gland 76 whereby the casing is hermetically sealed with respect to the cable 71.

The magnetic detector is laid on the bed of a body of water along the path of travel of a vessel thereby to generate impulses or waves of electromotive force within the coil as the magnetic field adjacent the coil is changed in accordance with the variations in the magnetic influence caused by the unequal distribution of the magnetic material of the vessel. Changes in the density of the magnetic field adjacent the detecting device as different portions of the hull of the ship are moved past the device cause variations in the magnetic field within the magnetic caps and core of the detector whereby a variable electromotive force is generated by the coil which is proportional to the changes in the magnetic field and thus the device may be employed for detecting the characteristic pattern of the magnetic field set up by the ship.

Located at an observation station is a recording instrument 77 of any type suitable for the purpose such, for example, as the photoelectric recorder No. 726337 shown in catalogue 32C144 of the General Electric Company and provided with terminals 80 for establishing an electrical connection between the conductors of cable 71 and the instrument. The recording instrument is provided with means such as an electric cord 78 and plug 79 for establishing an electrical connection to the conductors 81 extending to a source of electrical power. A strip chart 82 is caused to be moved by suitable means such as an electric motor operatively connected to the conductors 81 whereby a continuous record is made of the condition of the magnetic field adjacent the magnetic detector 72. The passage of a steel vessel or any vessel having a considerable mass of magnetic material therein within the vicinity of the magnetic detector causes a variation in the magnetic field within the caps 68 and core 67 thereby generating an electromotive force within the coil 66 sufficient to cause movement of the pen 83 variably in a direction substantially transverse to the movement of the strip chart whereby the signature of a ship such as shown at 84 is recorded by the instrument.

Whereas the magnetic induction coil of the present invention has been described with respect to a firing mechanism for an induction mine, it will, of course, be understood that it is equally applicable to other types of mines such, for example, as the type known as an induction gradient mine in which the differential rate of change of the magnetic field linking two coils in spaced relation to each other is employed to control the detonation of the mine.

Briefly stated in summary, the present invention contemplates the provision of a new and improved device for the detection of bodies of magnetic substances in which the sensitivity and the degree of coupling through the magnetic medium between the body and the detecting device have been substantially increased. Thus an arrangement is provided whereby the detonation of a submarine mine may be more positively controlled by magnetic induction at greater distances than has heretofore been possible. Also when employed for detecting changes in a magnetic field caused by the presence of a vessel within the vicinity of the detector, the device causes the range of detection and the degree of accuracy of the indication to be substantially increased.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is our intention therefore to cover in the appended claims all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a device of the character disclosed for remotely detecting the approach of a ship containing magnetic material, a search coil arranged within a magnetic field within which the ship moves and extended substantially throughout the length of the device, a linear bar of magnetic material disposed within said coil and adapted to engage lines of force which are substantially straight and parallel to said bar in the vicinity thereof, and flux gathering flanges in magnetic engagement with the ends respectively of the bar, said flanges extending laterally from the bar a distance substantially half the length of the bar whereby the flux within the bar is substantially uniform throughout and engages the search coil substantially uniformly throughout the length thereof.

2. In a submarine mine adapted to be laid on the bed of a body of water adjacent the path of travel of a vessel, a mine casing, a rod of magnetic material having an induction winding thereon, a pair of caps of magnetic material secured to the ends of said rod in coaxial relation therewith and in abutting relation with said casing thereby to form a chamber, an explosive charge arranged within said chamber intermediate said caps, and means controlled by said winding for firing said explosive charge in response to a predetermined change in the terrestrial magnetic field adjacent said caps.

3. In a device of the character disclosed adapted to sense changes in a magnetic field having substantially straight lines of force, the combination of a rod of magnetic material which extends substantially throughout the length of said sensing device, and a pair of substantially disk-shaped flux gathering devices respectively secured to each of the ends of said rod concentrically therewith each of said devices having a diameter substantially equal to the length of the rod and adapted to cause the magnetic flux of said field to be concentrated substantially uniformly throughout the length of the rod.

4. In a system for detecting small changes in the concentration of substantially straight flux lines of a magnetic field, a coil and core structure designed within predetermined dimensional limits for maximum field linkage per ohm of winding and comprising, in combination, a core having a length within said limits and high permeability for small field changes, a pair of transverse flux gathering caps of circular cross section respectively attached concentrically to the ends of said core and extended radially therefrom a distance substantially half the length of the core thereby to render the concentration of flux within the core substantially uniform throughout the length thereof, and a winding uniformly distributed throughout the full length of said core and having all turns thereof engaged by substantially all of the flux lines passing through any portion of the core.

5. In a detecting device adapted to cooperate with a sensitive relay for maximum power flow from the detecting device to the relay in response to small incremental changes in a weak magnetic field within which the device is placed, the combination of a core composed of material having high permeability to incremental changes in said field, said core having a length which is maximum within predetermined spacial limits of said device and having a diameter which is sufficient to prevent magnetic saturation of the core within said field, a pair of magnetic caps in magnetic contact with the ends of the core and extended radially therefrom to a diameter substantially equal to the length of the core, a coil wound uniformly on the core throughout substantially its entire length and in abutting relation with said caps, said caps being adapted to cause all turns of said coils to be engaged by substantially all of the lines of force traversing the midsection of the core, and said coil having a resistance substantially matching the resistance of said relay and having substantially the maximum number of turns per ohm of winding.

6. In a magnetic sensing device for detecting the movement within a magnetic field of vessels containing magnetic material, the combination of a core of ferromagnetic material possessing high permeability of high length to diameter ratio, a search coil disposed about said core throughout substantially its entire length for engaging substantially all of the lines of force engaging the core, and a pair of circular caps of magnetic material connected respectively to the ends of the core, said caps having diameters approximately equal to the length of the core whereby substantially the same number of lines of force are caused to engage the ends of the core as are engaged by the central portion thereof and all turns of the coil are caused to engage substantially all lines of force engaging any portion of the core.

7. In a mine firing device in combination, an explosive charge, an electrical relay responsive to small current impulses, means including a detonator for firing of the charge upon operation of said relay, a magnetic field detector including a flux gathering core extending throughout the length of the charge, a coil composed of a large number of turns encircling said core throughout substantially the full length thereof whereby to minimize the ohms per turn and having a sufficient number of turns to match the resistance of said relay, and a pair of magnetic caps coupled magnetically to said core at the extremities thereof respectively, said caps having diameters approximately equal to the length of said core whereby substantially all flux lines engaging the ends of said core engage all turns of the coil thereby to provide maximum response of the relay when the coil is operatively connected thereto and the ambient magnetic field is changed.

8. In a control circuit for firing an explosive charge contained within a chamber, a bar of magnetic material within said chamber and substantially co-extensive therewith for maximum flux gathering power, a pair of inwardly turned hemispherical magnetic caps secured to said bar and of diameter approximating the length of the bar, said caps being adapted to collect and transmit to the ends of said bar substantially all of the flux engaged by said bar, a coil encircling said bar throughout its length being partly within the space enclosed by said caps, said coil being uniformly distributed within predetermined limits of diameter and designed to contain the maximum turns for a predetermined total resistance thereof and having electrical leads for transmitting electric current impulses generated within the coil, and a sensitive relay of matching resistance operatively connected to said leads for completing said firing circuit when changes in the magnetic field cause current impulses within the coil.

9. In a firing mechanism for a submarine mine operative in response to small percentage changes in the intensity of the ambient magnetic field, a magnetic detector including a slender flux gathering core of maximum length containable within said mine, a pair of laterally extending magnetic caps of substantially the diameter of the mine arranged respectively in magnetic contact with the ends of said core to gather and transmit to the ends of the core substantially all of the flux lines engaging any part of the core thereby to permit substantially equally efficient utilization of all portions of the core for winding space, and a search coil uniformly wound on the core throughout the length thereof for generating electrical impulses in response to changes in flux engaging the core, an electro-responsive device operatively connected to said coil and including circuit making means, and means including a detonator connectable to a battery by said circuit making means for firing the mine when the ambient field changes by a small percentage.

WILSON R. MALTBY.
ROBERT H. PARK.

REFERENCES CITED

The following references are of record in the file of this patent:

UNITED STATES PATENTS

| Number | Name | Date |
| --- | --- | --- |
| 571,739 | Badt | Nov. 24, 1896 |
| 840,018 | Von Schoultz | Jan. 1, 1907 |
| 1,382,374 | Maxim | June 21, 1921 |
| 1,798,256 | Grondahl et al. | Mar. 31, 1931 |
| 2,016,977 | Thomas | Oct. 8, 1935 |
| 2,161,635 | Prokopenko | June 6, 1939 |
| 2,228,623 | Ennis | Jan. 14, 1941 |
| 2,317,718 | Barnes et al. | Apr. 27, 1943 |
| 2,252,059 | Barth | Aug. 12, 1941 |

FOREIGN PATENTS

| Number | Country | Date |
| --- | --- | --- |
| 348,257 | Germany | Feb. 3, 1922 |
| 803,907 | France | July 20, 1936 |